United States Patent
Turtinen et al.

(10) Patent No.: US 11,622,387 B2
(45) Date of Patent: Apr. 4, 2023

(54) MONITORING OF RANDOM ACCESS PROCEDURE

(71) Applicant: Nokia Technologies OY, Espoo (FI)

(72) Inventors: Samuli Turtinen, Ii (FI); Timo Koskela, Oulu (FI); Chunli Wu, Beijing (CN)

(73) Assignee: NOKIA TECHNOLOGIES OY, Espoo (FI)

(*) Notice: Subject to any disclaimer, the term of this patent is extended or adjusted under 35 U.S.C. 154(b) by 62 days.

(21) Appl. No.: 17/052,594

(22) PCT Filed: May 8, 2018

(86) PCT No.: PCT/CN2018/086063
§ 371 (c)(1),
(2) Date: Nov. 3, 2020

(87) PCT Pub. No.: WO2019/213846
PCT Pub. Date: Nov. 14, 2019

(65) Prior Publication Data
US 2021/0243810 A1 Aug. 5, 2021

(51) Int. Cl.
*H04W 74/08* (2009.01)
*H04L 5/00* (2006.01)
*H04W 74/04* (2009.01)

(52) U.S. Cl.
CPC ....... *H04W 74/0833* (2013.01); *H04L 5/0048* (2013.01); *H04W 74/04* (2013.01)

(58) Field of Classification Search
CPC . H04W 74/0833; H04W 74/04; H04W 72/02; H04L 5/0048
See application file for complete search history.

(56) References Cited

U.S. PATENT DOCUMENTS

2014/0162646 A1  6/2014  Lee et al.
2015/0271763 A1  9/2015  Balachandran et al.
(Continued)

FOREIGN PATENT DOCUMENTS

CN  101778482 A  7/2010
CN  103228026 A  7/2013
(Continued)

OTHER PUBLICATIONS

Office Action for Indian Application No. 202047052456 dated Dec. 13, 2021.
(Continued)

*Primary Examiner* — Steven H Nguyen
(74) *Attorney, Agent, or Firm* — Harness, Dickey & Pierce, P.L.C.

(57) ABSTRACT

In example an embodiment, according to the method, a timer is started to monitor selection of a RA resource in response to a RA procedure for accessing a network device being initiated. The timer is configured with expiration time. The timer is stopped in response to a RA resource being selected for transmitting a RA preamble to the network device. A preamble transmission counter is incremented in response to the timer expiring. The preamble transmission counter records the number of transmitted RA preambles. A failure of the RA procedure is indicated in response to the incremented preamble transmission counter exceeding a threshold. The embodiment enables completion of the RA procedure regardless of an out of coverage situation where no beam is available to be selected for transmitting a RA preamble.

21 Claims, 4 Drawing Sheets

(56) References Cited

U.S. PATENT DOCUMENTS

| | | | |
|---|---|---|---|
| 2016/0262047 A1* | 9/2016 | Yi | H04W 74/006 |
| 2016/0374073 A1 | 12/2016 | Oh | |
| 2018/0070403 A1* | 3/2018 | Uemura | H04W 48/16 |
| 2019/0182870 A1* | 6/2019 | Shih | H04W 74/004 |
| 2019/0274169 A1* | 9/2019 | Tsai | H04W 56/003 |

FOREIGN PATENT DOCUMENTS

| | | |
|---|---|---|
| CN | 107223353 A | 9/2017 |
| EP | 3054737 A1 | 8/2016 |

OTHER PUBLICATIONS

Office Action for European Application No. 18918060.7 dated Feb. 23, 2022.

LG Electronics Inc: "Correction to RACH Procedure", 3GPP Draft; R2-084162 [REL-8] Proposed CR to 36.321 Correction to RACH Procedure, 3rd Generation Partnership Project (3GPP), Mobile Competence Centre; 650, Route Des Lucioles; F-06921 Sophia-Antipolis Cedex; France, No. Jeju; Aug. 11, 2008, Aug. 11, 2008 (Aug. 11, 2008), XP050319298.

International Search Report PCT/ISA/210 for International Application No. PCT/CN2018/086063 dated Feb. 18, 2019.

Office Action and Search Report dated Oct. 9, 2022, issued in corresponding Chinese Patent Application No. 2018800931480.

\* cited by examiner

MONITORING OF RANDOM ACCESS PROCEDURE

TECHNICAL FIELD

Embodiments of the present disclosure generally relate to the field of communications, and in particular, to a method, device and computer readable storage media for monitoring a Random Access (RA) procedure.

BACKGROUND

Typically, a terminal device may initiate a RA procedure for accessing a network device. The terminal device may initiate the RA procedure by transmitting a RA preamble to the network device. In addition, the terminal device may utilize a preamble transmission counter to record the number of transmitted preambles. Conventionally, the Medium Access Control (MAC) entity of the terminal device may increase the preamble transmission counter only when a RA preamble was transmitted but a corresponding Random Access Response (RAR) cannot be received or contention resolution is considered unsuccessful. In case that the preamble transmission counter exceeds a preconfigured maximum number of preamble transmissions, the terminal device may determine that a failure of the RA procedure occurs. For example, in some cases, the failure of the RA procedure may be indicated by the MAC entity of the terminal device to an upper layer (such as, Radio Resource Control (RRC) layer) and trigger re-establishment of RRC connection or a Radio Link Failure (RLF). Alternatively, in case that the RA procedure is conducted on a Secondary Cell (SCell), the RA procedure can be considered unsuccessful.

However, in some cases (such as, in case of beam failure, or during beam failure recovery), there may be no downlink beam received at the terminal device with Reference Signal Received Power (RSRP) large enough to initiate the RA procedure. That is, in this event, the RA preamble will not be transmitted and thus the preamble transmission counter will not be increased.

Furthermore, in the 3rd Generation Partnership Project (3GPP) specifications, it has been agreed that there is no additional indication to the RRC layer on top of the mechanism associated with the preamble transmission counter in the RA procedure, which will trigger the Random Access Channel (RACH) failure and hence a RLF. As such, if there is no beam available to transmit the RA preamble, no mechanism can ensure the completion of the RA procedure and trigger the failure of the RA procedure.

SUMMARY

In general, example embodiments of the present disclosure provide a method, device and computer readable storage media for monitoring a RA procedure.

In a first aspect, there is provided a method implemented at a terminal device. According to the method, a timer is started to monitor selection of a RA resource in response to a RA procedure for accessing a network device being initiated. The timer is configured with expiration time. The timer is stopped in response to a RA resource being selected for transmitting a RA preamble to the network device. A preamble transmission counter is incremented in response to the timer expiring. The preamble transmission counter records the number of transmitted RA preambles. A failure of the RA procedure is indicated in response to the incremented preamble transmission counter exceeding a predetermined threshold.

In a second aspect, there is provided a device. The device comprises a processor and a memory coupled to the processor. The memory stores instructions that when executed by the processor, cause the device to perform actions. The actions comprise: in response to a Random Access (RA) procedure for accessing a network device being initiated, starting a timer to monitor selection of a RA resource, the timer being configured with expiration time; in response to a RA resource being selected for transmitting a RA preamble to the network device, stopping the timer; in response to the timer expiring, incrementing a preamble transmission counter, the preamble transmission counter recording the number of transmitted RA preambles; and in response to the incremented preamble transmission counter exceeding a predetermined threshold, indicating a failure of the RA procedure.

In a third aspect, there is provided a computer readable medium having instructions stored thereon. The instructions, when executed on at least one processor, cause the at least one processor to perform the method according to the first aspect of the present disclosure.

In a fourth aspect, there is provided a computer program product that is tangibly stored on a computer readable storage medium. The computer program product includes instructions which, when executed on at least one processor, cause the at least one processor to perform the method according to the first aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
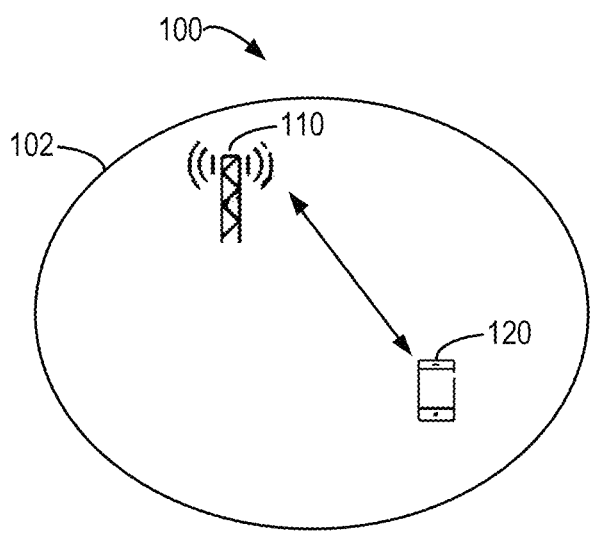
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and the fifth generation (5G) New Radio (NR), and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 shows an example communication network 100 in which implementations of the present disclosure can be implemented. The network 100 includes a network device 110 and a terminal device 120 served by the network device 110. The network 100 can provide at least one serving cell 102 to serve the terminal device 120. It is to be understood that the number of network devices, terminal devices and/or serving cells is only for the purpose of illustration without suggesting any limitations to the present disclosure. The network 100 may include any suitable number of network devices, terminal devices and/or serving cells adapted for implementing implementations of the present disclosure.

For example, in some scenarios, carrier aggregation (CA) can be supported in the network 100, in which two or more component carriers (CCs) are aggregated in order to support a broader bandwidth. In CA, the network device 110 may provide a plurality of serving cells (for example, one for each of the CCs) including one primary cell (PCell) and at least one Secondary Cell (SCell) to serve the terminal device 120. The terminal device 120 can establish Radio Resource Control (RRC) connection with the network device 110 in the PCell. The SCell can provide additional radio resources once the RRC connection between the network device 110 and the terminal device 120 is established and the SCell is activated via higher layer signaling.

In some other scenarios, for example, the terminal device 120 may establish connections with two different network devices (not shown in FIG. 1) and thus can utilize radio resources of the two network devices. The two network devices may be respectively defined as a master network device and a secondary network device. The master network device may provide a group of serving cells, which are also referred to as "Master Cell Group (MCG)". The secondary network device may also provide a group of serving cells, which are also referred to as "Secondary Cell Group (SCG) ". For Dual Connectivity operation, a term "Special Cell (SpCell)" may refer to the Pcell of the MCG or the primary Scell (PScell) of the SCG depending on if the terminal device 120 is associated to the MCG or the SCG, respectively. In other cases than the Dual Connectivity operation, the term "SpCell" may also refer to the PCell.

In the communication network 100 as shown in FIG. 1, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

For initial access to the network device 110, the terminal device 120 may initiate a Random Access (RA) procedure. In LTE, for example, the RA procedure can be divided into Contention-Based Random Access (CBRA) and Contention-Free Random Access (CFRA), which are respectively applicable to different use scenarios.

Figure 2:
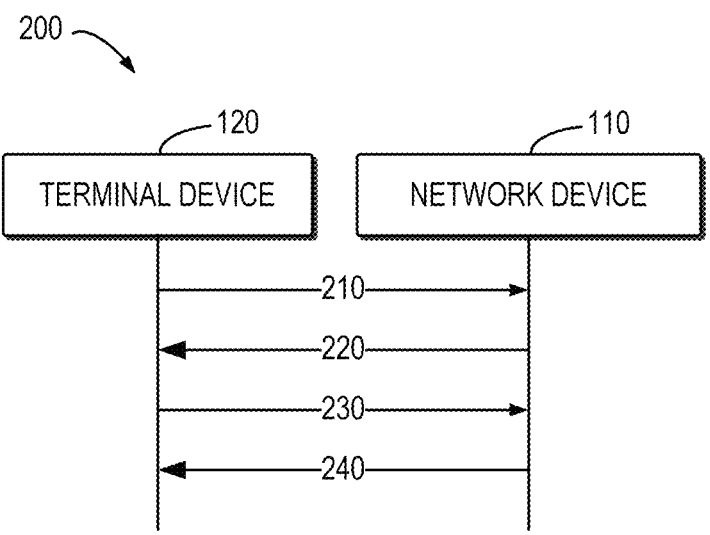
FIG. 2 shows a schematic diagram of a contention-based RA procedure according to some embodiments of the present disclosure.

FIG. 2 shows a schematic process of a CBRA procedure 200 according to some embodiments of the present disclosure. The RA procedure 200 may involve the network device 110 and the terminal device 120 served by the network device 110.

As shown in FIG. 2, the terminal device 120 starts the RA procedure 200 by transmitting (210) a RA preamble (MSG1) on Random Access Channel (RACH) to the network device 110. The network device 110 acknowledges the preamble it detects by transmitting (220) a RAR (MSG2), which includes an UL grant for Uplink Shared Channel (UL-SCH), a temporary Cell Radio Network Temporary Identification (C-RNTI) for the terminal device 120, and a timing advance Command (TAC). The UL grant in the MSG2 indicates an allowable size for MSG3. After receiving the RAR (MSG2), the terminal device 120 transmits (230), based on the UL grant, the MSG3 back to the network device 110 on UL-SCH. The MSG3 can be used to trigger the establishment of RRC connection and to uniquely identify the terminal device 120 on the common channels of a cell. The procedure 200 ends with the network device 110 solving any preamble contention that may have occurred in case that multiple terminal devices transmit the same preamble at the same time. The network device 110 resolves such contention by transmitting (240) a contention resolution message (MSG4) on Downlink Shared Channel (DL-SCH).

Figure 3:
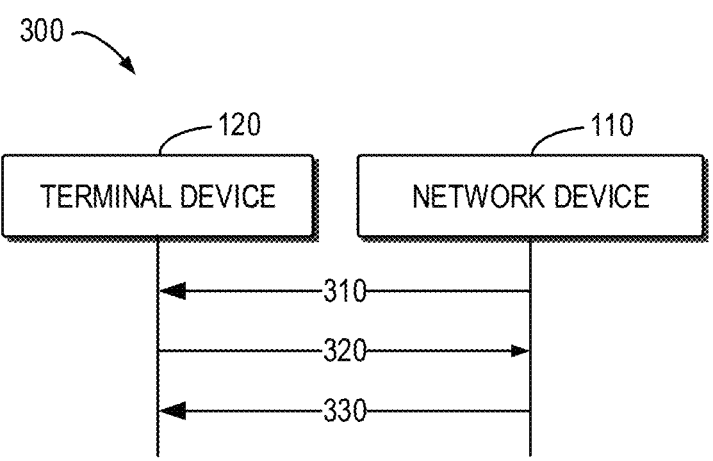
FIG. 3 shows a schematic diagram of a contention-free RA procedure according to some embodiments of the present disclosure.

FIG. 3 shows a schematic process of a CFRA procedure 300 according to some embodiments of the present disclosure. The RA procedure 300 may involve the network device 110 and the terminal device 120 served by the network device 110.

As shown in FIG. 3, the network device 110 transmits (310) an RA Preamble assignment (MSG0) to the terminal device 120, which include a dedicated preamble and a C-RNTI for the terminal device 120. After receiving the MSG0, the terminal device 120 transmits (320) the assigned RA preamble to the network device 110. The network device 110 acknowledges the preamble it detects by transmitting (330) a RAR (MSG2).

As described above, a failure of RACH or a RA procedure may only be triggered by a preamble transmission counter exceeding a preconfigured maximum number of preamble transmissions. Typically, the MAC entity of the terminal device may increase the preamble transmission counter only when a RA preamble was transmitted but a corresponding RAR cannot be received or unsuccessful contention resolution after the MSG 3 transmission is determined. However, in some cases (such as, in case of beam failure, or during beam failure recovery), there may be no downlink beam received at the terminal device with RSRP sufficiently large enough (for example, not exceeding a cell detection threshold or any other configured threshold) to initiate the RA procedure for both contention-based radio access and contention-free radio access. That is, in this event, the RA preamble will not be transmitted, the preamble transmission counter will not be increased and thus the RACH failure cannot be triggered.

Furthermore, in the 3GPP specifications, it has been agreed that no aperiodic indication of a successful Beam Failure Recovery (BFR) will be reported to RRC layer. A BFR failure will be a result of determination of a RACH failure and may be reported to the RRC layer which will trigger re-establishment of RRC connection or a SCG failure. According to the 3GPP specification, there is no additional indication to the RRC layer on top of the mechanism associated with the preamble transmission counter in the RA procedure, which will trigger the RACH failure and hence a RLF.

As such, if there is no beam available to transmit the RA preamble, there will be no mechanism to ensure the completion of the RA procedure and trigger of the RACH failure.

Embodiments of the present disclosure provide a scheme for monitoring a RA procedure. The basic idea is to utilize a timer to monitor the RA procedure performed by the MAC entity. In case that the RA preamble is not transmitted by the MAC entity, the timer will expire, which will result in the preamble transmission counter being incremented. Embodiments of the present disclosure enable completion of the RA procedure regardless of out of coverage situation where no beam is available to be selected for transmitting a RA preamble. Meanwhile, embodiments of the present disclosure do not require specific handling for CFRA or CBRA, but work well with both of them.

Figure 4:
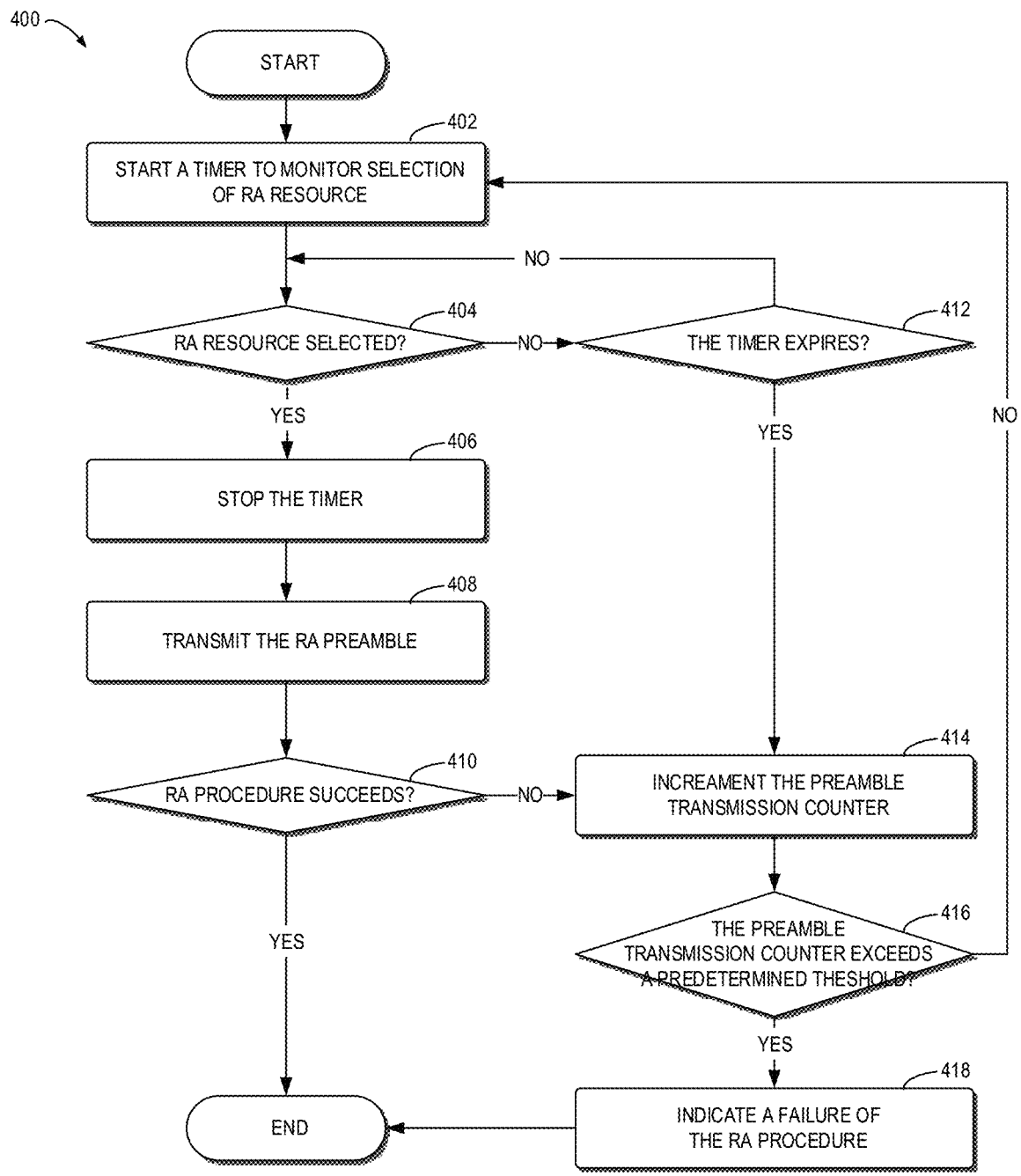
FIG. 4 shows a flowchart of an example method for monitoring a RA procedure according to some embodiments of the present disclosure.

FIG. 4 shows a flowchart of an example method 400 for monitoring a RA procedure according to some embodiments of the present disclosure. The method 400 can be implemented at the terminal device 120 as shown in FIG. 1. For example, the method 400 can be implemented by the MAC entity of the terminal device 120. For the purpose of discussion, the method 400 will be described from the perspective of the terminal device 120 with reference to FIG.

1. It is to be understood that the method 400 may include additional blocks not shown and/or may omit some blocks as shown, and the scope of the present disclosure is not limited in this regard.

At block 402, in response to a RA procedure for accessing the network device 110 being initiated, the terminal device 120 starts a timer to monitor selection of a RA resource. The timer may be configured with expiration time.

In some embodiments, the terminal device 120 may determine the expiration time of the timer based on a configuration received from the network device 110. In some other embodiments, the terminal device 120 may determine the expiration time by itself, for example, based on some preconfigured parameters or based on network configuration for other parameters. For example, the terminal device 120 may determine the expiration time based on at least one of the following: a periodicity of Synchronization Signal Blocks (SSBs) associated with the RA preamble; a periodicity of Channel State Information-Reference Signals (CSI-RSs) associated with the RA preamble; a periodicity of Random Access Channel occasions; a length of a time window to monitor a Random Access Response and so on. Some examples are provided as below.

For initial access to the network 100, the terminal device 120 may detect a primary synchronization signal (PSS) and a secondary synchronization signal (SSS) in signals transmitted in a downlink (DL) from the network device 110. Once the terminal device 120 detects the PSS and SSS, it can obtain the physical cell identity (cell ID). Meanwhile, according to the determined positions of the PSS and SSS in the DL, the terminal device 120 can obtain the timing information for downlink transmission and complete the downlink synchronization. The PSS and SSS may be included in a SSB. As used herein, a "SSB" refers to a transmission unit composed of a PSS, a SSS and associated PBCH signals. A SSB burst set may include a number of SSBs, and the SSB burst set may be repeated in a radio frame with a certain periodicity.

In some embodiments, if the CBRA or CFRA preambles are associated with SSBs only, the terminal device 120 may determine the expiration time of the timer based on a periodicity of the SSBs. For example, the expiration time of the timer can be determined as an integer multiple of the periodicity of the SSBs associated with the CBRA or CFRA preambles.

Alternatively, or in addition, in some embodiments, if the CBRA or CFRA preambles are associated with CSI-RSs for beam management, the terminal device 120 may determine the expiration time of the timer based on a periodicity of the CSI-RSs associated with the RA preambles. For example, the expiration time of the timer can be determined as an integer multiple of the periodicity of the CSI-RSs for beam management.

In some embodiments, if the RA preambles are associated with both CBRA and CFRA, the terminal device 120 may determine the expiration time of the timer based on the minimum or maximum value of SSB periodicities, or the minimum or maximum value of CSI-RS periodicities.

In some embodiments, the terminal device 120 may determine the expiration time of the timer based on the periodicity of SSBs and a beamforming capability of the terminal device 120. For example, suppose that the terminal device 120 has N antenna panels it can use for measurements, and only M of the N antenna panels can be active at the same time for measurements. In this case, for example, the terminal device 120 may determine the expiration time of the timer as an integer multiple of (SSB_periodicity*N/M), where SSB_periodicity represents the periodicity of SSBs.

In some embodiments, in case of CBRA, the terminal device 120 may determine the expiration time of the timer based on RACH resource periodicity of a single SSB. For example, RACH occasions for transmitting the RA preamble may be divided into a plurality of uplink occasions and have a fixed periodicity. The terminal device 120 may determine the expiration time of the timer as an integer multiple of the fixed periodicity of the RACH occasions.

In some embodiments, in case of CFRA, the terminal device 120 may determine the expiration time of the timer based on a periodicity of RACH occasions for transmitting the RA preamble. For example, the terminal device 120 may determine the expiration time of the timer as an integer multiple of the periodicity of RACH occasions for transmitting the RA preamble.

In some embodiments, the terminal device 120 may determine the expiration time of the timer based on a length of a time window to monitor the RAR. As used herein, the time window to monitor the RAR can also be referred to as "RAR window".

In some embodiments, the terminal device 120 may determine the expiration time of the timer based on any combination of the above factors. Alternatively, or in addition, the terminal device 120 may also determine the expiration time of the timer based on other factors than the above ones, and the scope of the present disclosure is not limited in this regard. As such, the terminal device 120 can determine the expiration time of the timer, and start the timer based on the expiration time.

At block 404, the terminal device 120 determines whether RA resource is selected for transmitting a RA preamble to the network device 110. In some embodiments, the terminal device 120 may determine if at least one of the SSBs with RSRP (also referred to as Synchronization Signal-Reference Signal Received Power (SS-RSRP)) above a RSRP threshold for SSB (also referred to as "first threshold") or the CSI-RSs with RSRP (also referred to as Channel State Information-Reference Signal Received Power (CSI-RSRP)) above a RSRP threshold for CSI-RS (also referred to as "second threshold") is available. If it is determined to be available, the terminal device 120 may select at least one of the SSBs with SS-RSRP above the first threshold or the CSI-RSs with CSI-RSRP above the second threshold as the RA resource for transmitting the RA preamble. In some embodiments, the terminal device 120 may select the RA resource for transmitting the RA preamble as specified in sub-clause 5.1.2 "Random Access Resource selection" in the MAC specification in TS 38.321 of the 3GPP specifications, which will not be described in detail herein.

In response to a RA resource being selected for transmitting a RA preamble to the network device 110, at block 406, the terminal device 120 stops the timer. Then, at block 408, the terminal device 120 transmits the RA preamble to the network device 110 with the selected Random Access resource.

Once the RA preamble is transmitted to the network device 110, at block 410, the terminal device 120 determines whether the RA procedure is successful. In some embodiments, for example, if the RAR containing a RA preamble identifier that matches the index of the transmitted RA preamble is received within the RAR window and the subsequent contention resolution after the MSG3 transmission on the UL grant in RAR succeeds, or if the PDCCH addressed to the C-RNTI is received with the RAR window, the terminal device 120 may determine that the RA procedure succeeds. Otherwise, the method 400 proceeds to block 414, where the terminal device 120 increments the preamble transmission counter by 1.

In response to the RA resource for transmitting a RA preamble to the network device 110 being unavailable (for example, no beam is detectable), the method 400 proceeds to block 412, where the terminal device 120 determines whether the timer expires. If the timer does not expire, the method 400 proceeds to block 404, where the terminal device 120 continues the Random Access resource selection procedure and determines whether a Random Access resource for transmitting the RA preamble can be selected. In response to the timer expires, the method 400 proceeds to block 414, where the terminal device 120 increments the preamble transmission counter by 1.

At block 416, the terminal device 120 determines whether the preamble transmission counter exceeds the preconfigured maximum number of preamble transmissions. If the incremented preamble transmission counter exceeds the preconfigured maximum number of preamble transmissions, at block 418, the terminal device 120 indicates a failure of the RA procedure. In some embodiments, if the RA procedure is initiated on a SpCell, the failure of the RA procedure may be indicated by the MAC entity of the terminal device 120 to an upper layer (for example, the RRC layer). In some embodiments, if the RA procedure is initiated on a PSCell, an SCG failure may be indicated by the terminal device 120. In some embodiments, if the RA procedure is initiated on a SCell, the terminal device 120 may determine that a failure of the RA procedure occurs. If the terminal device 120 determines that the preamble transmission counter is below the preconfigured maximum number of preamble transmissions, the method 400 proceeds to block 402, where the terminal device 120 restarts a timer to monitor selection of a RA resource. For example, the terminal device 120 may restart the timer when preamble transmission re-attempt is initiated (that is, when the selection of a RA resource for transmitting a RA preamble is re-initiated).

In some embodiment, the network device 110 may transmit a configuration to the terminal device 120, indicating that whether the timer based increment of the preamble transmission counter is used only for the RA procedure due to BFR or for any RA procedure in general. Alternatively, in some embodiments, whether the timer based increment of the preamble transmission counter is used only for the RA procedure due to BFR or for any RA procedure in general can be explicitly defined in the specifications. For example, suppose that the configuration received from the network device 110 indicates that the timer based increment of the preamble transmission counter is used only for the RA procedure due to BFR. In this event, only when the RA procedure is initiated for BFR, the terminal device 120 may increment the preamble transmission counter in response to the timer expiring. Regarding preamble transmissions for other purposes than BFR, if the terminal device 120 fails to perform the selection of the RA resource for transmitting the RA preamble (for example, due to SSB or CSI-RS being below the RSRP threshold), the terminal device 120 may consider the selection of the random access resource to be pending, or the terminal device 120 may utilize previous measurement results of the random access resource for the time they are considered valid (for example, exceeding the detection threshold).

Alternatively, in some embodiments, the MAC entity of the terminal device 120 may continue to run the RA procedure even though no RA preamble is transmitted, such that the preamble transmission counter can get updated regardless of the RA preamble being transmitted or not.

Embodiments of the present disclosure provide a scheme for monitoring a RA procedure. The scheme utilizes a timer to monitor the RA procedure performed by the MAC entity. In case that the RA preamble is not transmitted by the MAC entity, the timer will expire, resulting in the preamble transmission counter being incremented. Embodiments of the present disclosure enable completion of the RA procedure regardless of out of coverage situation where no beam is available to be selected for transmitting a RA preamble. Meanwhile, embodiments of the present disclose do not require specific handling for contention-free or contention-based random access, but work well with both of them.

In some embodiments, an apparatus capable of performing the method 400 (for example, the terminal device 120 may comprise means for performing the respective steps of the method 400. The means may be implemented in any suitable form. For example, the means may be implemented in a circuitry or software module.

In some embodiments, the apparatus comprises: means for starting a timer to monitor selection of a Random Access resource in response to a RA procedure for accessing a network device being initiated, the timer being configured with expiration time; means for stopping the timer in response to a Random Access resource being selected for transmitting a RA preamble to the network device; means for incrementing a preamble transmission counter in response to the timer expiring, the preamble transmission counter recording the number of transmitted RA preambles; and means for indicating a failure of the RA procedure in response to the incremented preamble transmission counter exceeding a predetermined threshold.

In some embodiments, the apparatus further comprises: means for transmitting the RA preamble to the network device with the selected Random Access resource in response to the time being stopped.

In some embodiments, the apparatus further comprises: means for incrementing the preamble transmission counter in response to failing to receive a Random Access Response from the network device.

In some embodiments, the apparatus further comprises: means for restarting the timer to monitor selection of a RA resource in response to the incremented preamble transmission counter being below the predetermined threshold.

In some embodiments, the Random Access resource selected for transmitting the RA preamble includes at least one of the following: an Synchronization Signal Block (SSB) with RSRP exceeding a first threshold; and a Channel State Information-Reference Signal (CSI-RS) with RSRP exceeding a second threshold.

In some embodiments, the means for starting the timer comprises: means for determining the expiration time; and means for starting the timer based on the expiration time.

In some embodiments, the means for determining the expiration time comprises: means for receiving a configuration about the timer from the network device; and means for determining the expiration time based on the configuration about the timer.

In some embodiments, the means for determining the expiration time comprises means for determining the expiration time based on at least one of the following: a periodicity of SSBs associated with the RA preamble; a periodicity of CSI-RSs associated with the RA preamble; a periodicity of Random Access Channel occasions; and a length of a time window to monitor a RAR.

In some embodiments, the RA procedure is one of a contention-based RA procedure and a contention-free RA procedure.

In some embodiments, the RA procedure is initiated for beam failure recovery.

Figure 5:
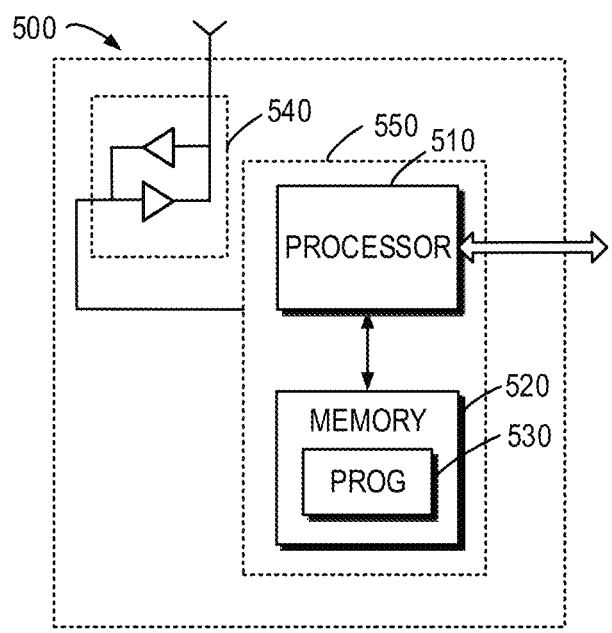
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 can be implemented at or as at least a part of the terminal device 120 as shown in FIG. 1.

As shown, the device 500 includes a processor 510, a memory 520 coupled to the processor 510, a suitable transmitter (TX) and receiver (RX) 540 coupled to the processor 510, and a communication interface coupled to the TX/RX 540. The memory 520 stores at least a part of a program 530. The TX/RX 540 is for bidirectional communications. The TX/RX 540 has at least one antenna to facilitate communication, though in practice an Access Node mentioned in this application may have several ones. The communication interface may represent any interface that is necessary for communication with other network elements, such as X2 interface for bidirectional communications between eNB s, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 530 is assumed to include program instructions that, when executed by the associated processor 510, enable the device 500 to operate in accordance with the implementations of the present disclosure, as discussed herein with reference to FIGS. 2 to 4. The implementations herein may be implemented by computer software executable by the processor 510 of the device 500, or by hardware, or by a combination of software and hardware. The processor 510 may be configured to implement various implementations of the present disclosure. Furthermore, a combination of the processor 510 and memory 520 may form processing means 550 adapted to implement various implementations of the present disclosure.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, comprising:
   in response to a Random Access (RA) procedure for accessing a network device being initiated, starting a timer to monitor selection of a RA resource, the timer being configured with expiration time;
   in response to a RA resource being selected for transmitting a RA preamble to the network device, stopping the timer;
   in response to the timer expiring, incrementing a preamble transmission counter, the preamble transmission counter recording the number of transmitted RA preambles; and
   in response to the incremented preamble transmission counter exceeding a predetermined threshold, indicating a failure of the RA procedure.

2. The method of claim 1, further comprising:
   in response to the timer being stopped, transmitting the RA preamble to the network device with the selected RA resource.

3. The method of claim 2, further comprising:
   in response to failing to receive a Random Access Response from the network device, incrementing the preamble transmission counter.

4. The method of claim 1, further comprising:
   in response to the incremented preamble transmission counter being below the predetermined threshold, restarting the timer to monitor selection of a RA resource.

5. The method of claim 1, wherein the RA resource selected for transmitting the RA preamble includes at least one of the following:
   a Synchronization Signal Block with Reference Signal Receiving Power (RSRP) exceeding a first threshold; and
   a Channel State Information-Reference Signal with RSRP exceeding a second threshold.

6. The method of claim 1, wherein starting the timer comprises:
   determining the expiration time; and
   starting the timer based on the expiration time.

7. The method of claim 6, wherein determining the expiration time comprises:
   receiving a configuration about the timer from the network device; and
   determining the expiration time based on the configuration about the timer.

8. The method of claim 6, wherein determining the expiration time comprises:
   determining the expiration time based on at least one of the following:
   a periodicity of Synchronization Signal Blocks associated with the RA preamble;
   a periodicity of Channel State Information-Reference Signals associated with the RA preamble;
   a periodicity of Random Access Channel occasions; and
   a length of a time window to monitor a Random Access Response.

9. The method of claim 1, wherein the RA procedure is one of a contention-based RA procedure and a contention-free Random Access procedure.

10. The method of claim 1, wherein the RA procedure is initiated for beam failure recovery.

11. The method of claim 1, further comprising:
    in response to initiating random access resource selection for transmitting a Random Access preamble, restarting the timer to monitor selection of a RA resource.

12. A device comprising:
    a processor; and
    a memory coupled to the processor and having instructions stored thereon, the instructions, when executed by the processor, causing the device to perform actions comprising:
    in response to a Random Access (RA) procedure for accessing a network device being initiated, starting a timer to monitor selection of a RA resource, the timer being configured with expiration time;
    in response to a RA resource being selected for transmitting a RA preamble to the network device, stopping the timer;
    in response to the timer expiring, incrementing a preamble transmission counter, the preamble transmission counter recording the number of transmitted RA preambles; and
    in response to the incremented preamble transmission counter exceeding a predetermined threshold, indicating a failure of the RA procedure.

13. The device of claim 11, wherein the actions further comprise:
    in response to the timer being stopped, transmitting the RA preamble to the network device with the selected RA resource.

14. The device of claim 12, wherein the actions further comprise:
    in response to failing to receive a Random Access Response from the network device, incrementing the preamble transmission counter.

15. The device of claim 12, wherein the actions further comprise:
    in response to the incremented preamble transmission counter being below the predetermined threshold, restarting the timer to monitor selection of a RA resource.

16. The device of claim 12, wherein the Random Access resource selected for transmitting the RA preamble includes at least one of the following:
- a Synchronization Signal Block with Reference Signal Receiving Power (RSRP) exceeding a first threshold; and
- a Channel State Information-Reference Signal with RSRP exceeding a second threshold.

17. The device of claim 12, wherein starting the timer comprises:
- determining the expiration time; and
- starting the timer based on the expiration time.

18. The device of claim 17, wherein determining the expiration time comprises:
- receiving a configuration about the timer from the network device; and
- determining the expiration time based on the configuration about the timer.

19. The device of claim 16, wherein determining the expiration time comprises:
- determining the expiration time based on at least one of the following:
  - a periodicity of Synchronization Signal Blocks associated with the RA preamble;
  - a periodicity of CSI-RSs associated with the RA preamble;
  - a periodicity of Random Access Channel occasions; and
  - a length of a time window to monitor a Random Access Response.

20. The device of claim 12, wherein the RA procedure is one of a contention-based RA procedure and a contention-free RA procedure.

21. A non-transitory computer readable storage medium having instructions stored thereon, the instructions, when executed on at least one processor, causing the at least one processor to carry out the method according to claim 1.

* * * * *